W. F. BROWNE.
Apparatus for Stacking Hay and Grain.
No. 65,471.  Patented June 4, 1867.
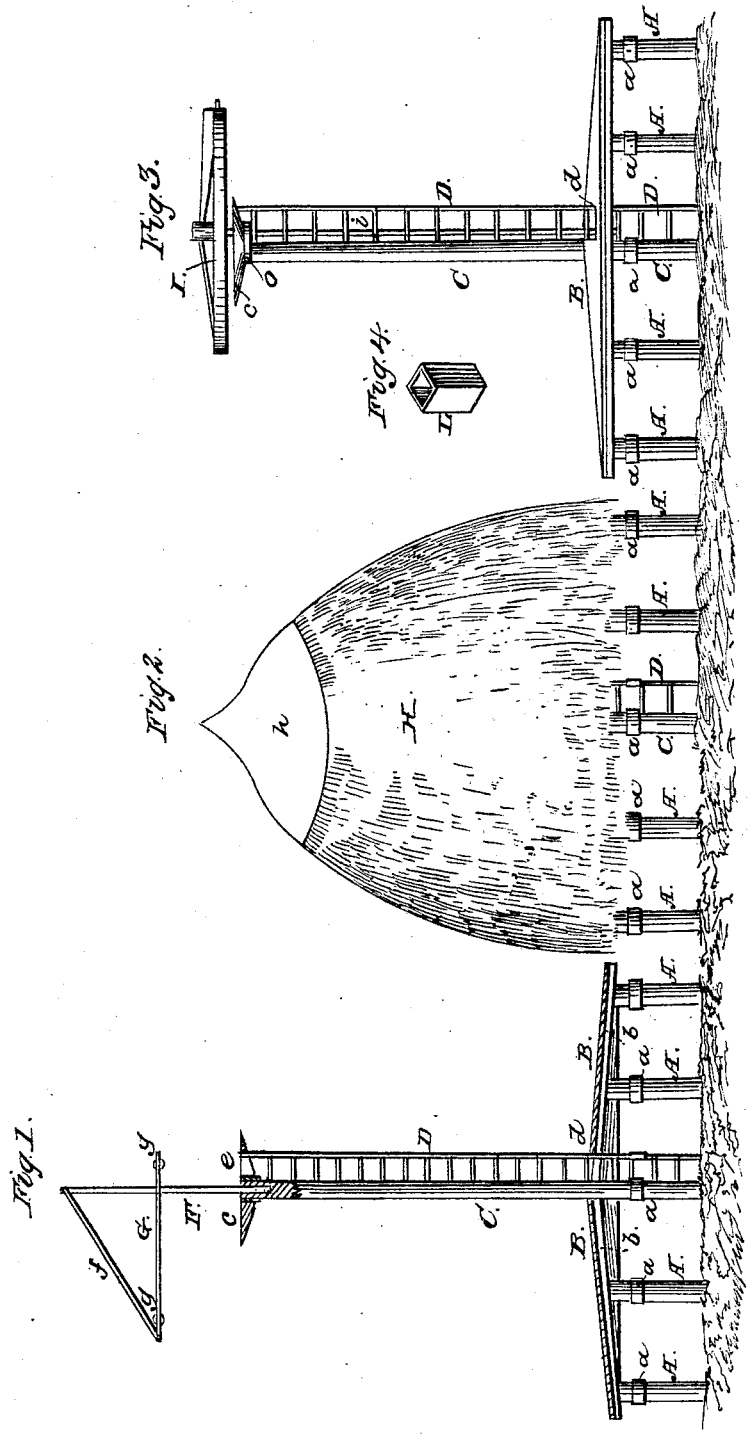

United States Patent Office.

WILLIAM F. BROWNE, OF WASHINGTON, DISTRICT OF COLUMBIA.

*Letters Patent No. 65,471, dated June 4, 1867.*

---

APPARATUS FOR STACKING HAY AND GRAIN.

---

*The Schedule referred to in these Letters Patent and making part of the same.*

---

TO ALL WHOM IT MAY CONCERN:

Be it known that I, WILLIAM FRANK BROWNE, of Washington, in the county of Washington, and District of Columbia, have invented an improved Apparatus for Stacking Hay and Grain, and for sheltering stock, farming implements, &c.; and I do hereby declare that the following is a full and exact description thereof, reference being had to the accompanying drawings, making part of this specification—

Figure 1 being a central vertical section of the apparatus in ordinary form.

Figure 2, a side elevation of a stack of hay built upon the stacker, showing also the appearance of the lower part of the stacker under the hay.

Figure 3, a side elevation of the empty stacker, arranged for applying a wind-wheel thereto.

Figure 4, a view in perspective of a movable box for forming a well-hole up through the middle of the stack of hay or grain.

Like letters designate corresponding parts in all of the figures.

The leading feature of my invention is the elevation of the platform or support on which the stack is built to a sufficient height above the ground to furnish room underneath it for sheltering stock, implements, machines, &c.

Another important feature is the combination of a vertical shaft or mast with the stacker, by which the elevation of the hay and grain can be effected, and with which a ladder may be constructed for ascending to the top of the stack or of the shaft. By this shaft, also, a wind-wheel or power may be applied and sustained for driving pumps or any machinery below the stacker.

The special construction of the component parts of the apparatus and its adjuncts may vary in many particulars from that I shall herein describe without departing from the essential features of my invention. But I shall proceed to describe a convenient construction and arrangement of parts suitable for ordinary use.

First, the platform or frame B is to be mounted at a proper height above the ground to afford room for sheltering stock, and to enable men to walk and work under it. This height, in general, may be stated to be seven feet, or thereabout, in the clear. The platform is to be generally supported by upright posts or staddles, A A, standing or driven into the ground. The latter method, for ordinary stackers, is the preferable one, since smaller timbers may thus be used; and the posts driven into the ground insure a firmness and stability of construction which cannot otherwise well be obtained. In well-timbered regions these posts are readily and cheaply obtained, and are at once ready to be driven into the ground, a foot or two, like piles. Instead of wooden posts cast-iron posts may be substituted in cases where beauty of appearance and great durability are leading objects, but I do not contemplate these ordinarily, nor generally recommend their use.

Upon the upper ends of these posts a suitable capping of timbers or joists, b b, is secured by spiking or framing, they being laid so as to furnish a proper support for a floor, B, which I would generally use, but which is not essential for hay, but for grain it is desirable if not indispensable. Besides, this floor may be made to serve as a roof for sheltering the stock and implements below when there is no hay or grain on the stacker. For this purpose the platform should properly slope downward somewhat from the centre, as shown, and the boards or planks should be so placed as to shed the water at the eaves. The floor may be battened over the cracks between the boards.

The stacker may be round, or of any other convenient shape, as octagonal, square, or oblong. Ordinarily a round stacker, say twenty-five feet in diameter, is a convenient size, and it will hold from twenty-five to fifty tons of hay. Larger dimensions across the stacker are not desirable, making it troublesome to shelter the hay and grain properly unless the stack is built up correspondingly high. But where a greater capacity than one stacker twenty-five feet in diameter is desired, either the number of separate stackers may be increased or an oblong stacker, say twenty-five feet wide, and as long as required, may be built.

To protect the hay or grain from the depredations of rats, mice, and other vermin, I shield the posts A A with bands *a a* of sheet, tin, or sheet iron, as shown, or of any other equivalent way, to prevent ascending to the stack. And any other part of the apparatus extending from the ground to the platform should be in like manner guarded.

Beneath the platform there is always a shelter for animals and implements from rain, and if a further protection from the wind and weather is desired, it is easy to enclose the whole space by boarding up around the posts A A, with doors as in a regular barn; and the space inside may be divided into rooms and stalls to suit the demands or convenience of the owner. A threshing-floor is very properly located under the grain stacker, where the grain can be threshed out and cleansed.

In addition to the parts above described an important feature is a shaft or mast, C. For the ordinary circular, octagonal, or square stacker, a single shaft is located in the centre thereof, being planted in the ground at the bottom, thence extending up through the platform, where it is firmly secured or braced, and thence reaching to a height of say twenty-five or thirty feet, more or less. It may be a single piece six inches in diameter, more or less. Where a long stacker is used there may be a number of these shafts placed at a distance apart about equal to the width of the stacker, say twenty-five feet, or thereabout. The mast or shaft may be stationary, as above set forth, or may be removable, and movable from one part of the platform to another or to one side of it. In this case, the shaft should have a means of splicing it to sockets or supports on or reaching up through the platform. This shaft or mast may have a truck, $e$, on its upper end to stand on when one ascends to the top. And in the top of the shaft I usually make a socket to receive a crane or pulley staff, F, as seen in fig. 1. The crane-beam G should have pulleys, $g\ g$, over which a rope passes for operating a hay-elevator to raise the hay or grain upon the stack. A simple pulley may be used instead of the crane.

When power is to be applied for pumping, threshing, winnowing, &c., a wind-wheel, I, fig. 3, is to be applied over the shaft C, its power being transmitted by a spindle, $i$, down to the work under the platform. There may be either a horizontal or vertical wind-wheel of any simple construction.

In order to ascend to the top of the shaft or stack a ladder, D, is employed, being most conveniently framed to the shaft, as shown. When the shaft is movable the ladder should be movable with it.

In building the stack I make a well-hole in it by the side of the ladder, large enough for a man to go up and down in it on the ladder. For this purpose a square box, L, fig. 4, open at top and bottom, is used for the stack to be built around, the box being from time to time raised as the stack rises in height. Any other form or construction of the box may be used.

A trap-hole or doorway, $d$, is made in the platform, by the ladder, to enable one to ascend from the ground, and the ladder generally reaches down to the ground. The well-hole in the hay serves also for a ventilator. A trap or door closes the way $d$ when desired.

When the stack is built it may be capped with a canvas, $h$, fig. 2, or be covered by a movable roof, or be thatched.

What I claim as my invention, and desire to secure by Letters Patent, is—

The combination and arrangement of the elevated, sheltering platform, the mast with its elevating crane, and the ladder for ascending the mast or stack, substantially as and for the purposes herein specified.

WM. FRANK BROWNE.

Witnesses:
   J. NOTTINGHAM SMITH,
   THOS. E. WHITING.